United States Patent
Brown et al.

(10) Patent No.: US 9,170,140 B2
(45) Date of Patent: Oct. 27, 2015

(54) ULTRASONIC FLOWMETER WITH INTERNAL SURFACE COATING AND METHOD

(75) Inventors: Gregor J. Brown, Scotland (GB); Donald R. Augenstein, Pittsburgh, PA (US); Calvin R. Hastings, Mt. Lebanon, PA (US); William R. Freund, Jr., Moon Township, PA (US)

(73) Assignee: Cameron International Corporation, Houston, TX (US)

(*) Notice: Subject to any disclaimer, the term of this patent is extended or adjusted under 35 U.S.C. 154(b) by 270 days.

(21) Appl. No.: 13/464,500

(22) Filed: May 4, 2012

(65) Prior Publication Data

US 2013/0291650 A1 Nov. 7, 2013

(51) Int. Cl.
*G01F 1/66* (2006.01)
*G01F 15/00* (2006.01)
*G01F 15/14* (2006.01)

(52) U.S. Cl.
CPC .............. *G01F 1/662* (2013.01); *G01F 15/006* (2013.01); *G01F 15/14* (2013.01); *Y10T 29/49007* (2015.01)

(58) Field of Classification Search
CPC ........... G01F 1/662; G01F 1/66; G01F 1/667; G01F 15/006; G01F 15/14; G01F 1/329; Y10T 29/49007
USPC ............... 73/861.11–861.15, 861.25–861.31; 29/595
See application file for complete search history.

(56) References Cited

U.S. PATENT DOCUMENTS

| | | | |
|---|---|---|---|
| 6,609,430 B1* | 8/2003 | Joshi et al. | 73/861.28 |
| 8,120,370 B2* | 2/2012 | Harada et al. | 324/658 |
| 2003/0047007 A1* | 3/2003 | Baumoel | 73/861.27 |
| 2004/0200056 A1* | 10/2004 | Suzuki et al. | 29/595 |
| 2006/0156828 A1* | 7/2006 | Konzelmann et al. | 73/861.25 |
| 2008/0066558 A1* | 3/2008 | Sulzer et al. | 73/861.12 |
| 2008/0202250 A1* | 8/2008 | Koehler et al. | 73/756 |
| 2009/0038409 A1* | 2/2009 | Ruchel | 73/861.12 |
| 2009/0277278 A1* | 11/2009 | Koudal et al. | 73/861.08 |
| 2009/0301205 A1* | 12/2009 | Reiche | 73/632 |
| 2010/0011877 A1* | 1/2010 | Izumi et al. | 73/861.12 |
| 2010/0037703 A1* | 2/2010 | Sulzer et al. | 73/861.12 |
| 2010/0192702 A1* | 8/2010 | Satou et al. | 73/861.27 |
| 2010/0313676 A1* | 12/2010 | Straub, Jr. | 73/861.28 |
| 2011/0153225 A1* | 6/2011 | Mangal et al. | 702/24 |
| 2012/0160035 A1* | 6/2012 | Casey et al. | 73/861.355 |

FOREIGN PATENT DOCUMENTS

GB 855650 * 12/1960

* cited by examiner

*Primary Examiner* — Lisa Caputo
*Assistant Examiner* — Philip Cotey
(74) *Attorney, Agent, or Firm* — Ansel M. Schwartz

(57) ABSTRACT

An ultrasonic flowmeter includes a meter body including a flow passage having wetted surfaces through which fluid flow is to be measured. The flowmeter includes a non-stick coating adhered to the wetted surfaces of the meter body. The flowmeter includes a first transducer and at least a second transducer arranged around the flow passage to transmit and receive ultrasonic energy. The flowmeter includes an electronic unit designed to generate and receive electronic signals from the transducers and to process the signals in order to compute information related to the fluid flow rate through the passage. A method for measuring fluid flow with an ultrasonic flowmeter. A method of making an ultrasonic flowmeter.

22 Claims, 5 Drawing Sheets

ULTRASONIC FLOWMETER WITH INTERNAL SURFACE COATING AND METHOD

FIELD OF THE INVENTION

The present invention relates to the measurement of fluid flow with the use of transit time ultrasonic flowmeters. (As used herein, references to the "present invention" or "invention" relate to exemplary embodiments and not necessarily to every embodiment encompassed by the appended claims.) In particular, the present invention relates to the measurement of fluids where contaminants may be likely to adhere to or corrode the internal surfaces of the flowmeter.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Transit time ultrasonic flowmeters function by measuring the time it takes for ultrasonic signals to propagate between transducers placed at different locations around or inside a meter body through which the fluid is conveyed. The cross-sectional area of the flow passage through the meter body, the path lengths separating pairs of transducers, and the angle to the flow axis formed between pairs of transducers all play a part in the relationship between the measured times and the rate of flow.

The relationship between the measured transit times and the meter geometry is normally derived from the principle of operation. Calculation of the flow rate then depends on numerical inputs that characterize the geometry of the meter body. These inputs may be derived from design information or based on physical measurement of the meter body, and in the case of high-accuracy ultrasonic meters will normally include calibration parameters that act to correct errors arising from assumptions and/or geometric uncertainties.

In applications where the process fluid may contain contaminants or where the meter body may be prone to erosion or corrosion, the effective geometry of the meter body can be altered. If a change in geometry occurs and is not corrected by calibration or some other means, then this may result in a flow measurement error. For example, if the cross-sectional area of the flow passage is reduced, then the flow velocity may increase. And if the computation of flow rate does not account for the reduced area, the flow rate may be over-registered.

It is known in the field of ultrasonic flow metering that alteration of the internal condition of an ultrasonic meter may affect the accuracy of the meter in the manner described above. See, for example, *John Lansing, Dirty vs. Clean Ultrasonic Gas Flow Meter Performance, AGA Operations Conference, Chicago, Ill.* 2002. Work has also been carried out with the aim of proving self-diagnosing capability for ultrasonic meters in such situations see for example, John Lansing, *How Today's USM diagnostics solve metering problems*, North Sea Flow Measurement Workshop, 2005, Tonsberg, Norway.

In oil pipelines various potential contaminants exist, for example, in the form of paraffin wax, asphaltines and inorganic scale. In gas pipelines black powder contamination is well known. The nature of black powder contamination is varied and uncertain but may be from mill scale or corrosion products mechanically mixed or chemically combined with any number of contaminants such as water, liquid hydrocarbons, salts, chlorides, sand, or dirt. Chemical analyses of black powder contamination have revealed that it typically consists mainly of a mixture of iron oxides and iron sulphides. Furthermore, pipelines may also contain water, including salt water, which can lead to corrosion of the internal parts of ultrasonic flowmeter bodies.

Therefore, it is desirable that the internal surfaces of ultrasonic meters be resistant to corrosion and the deposition of contaminants.

BRIEF SUMMARY OF THE INVENTION

The invention described in this document may be used to prevent contaminants from affecting fluid flow through a flow passage of an ultrasonic flowmeter as well as the signals used by the flowmeter to determine the fluid flow through the flow passage, both of which can introduce error into the flow measurement. The invention, in accordance with certain embodiments, involves the presence of a non-stick coating on the wetted surfaces of the flowmeter which is believed to limit the buildup of contaminants on the wetted surfaces that could affect the fluid flow and the signals of the flowmeter.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
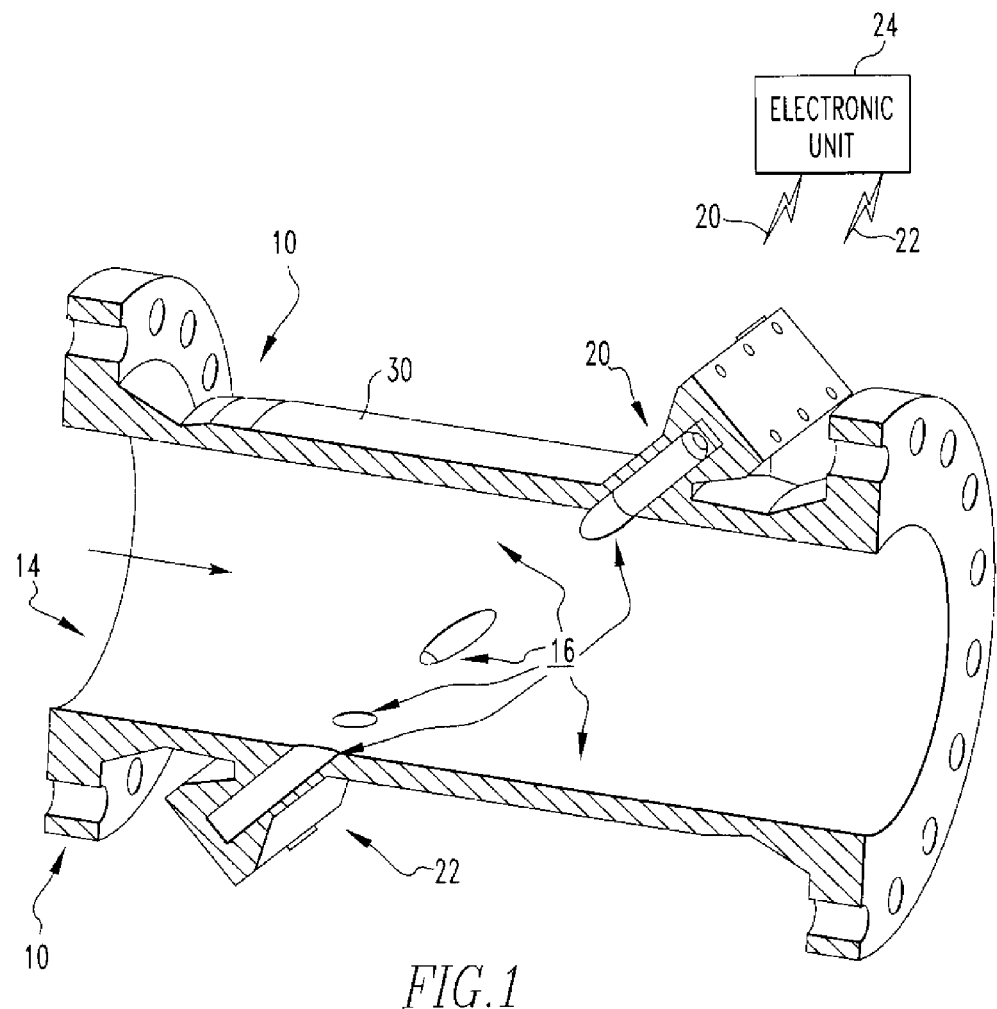
FIG. 1 is an illustration highlighting the wetted surfaces of the meter body and transducer housings.
Figure 5:
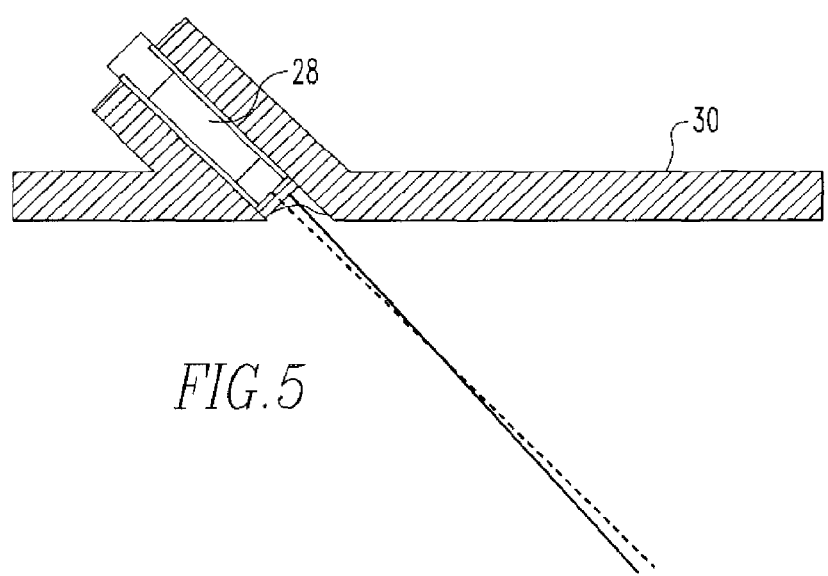
FIG. 5 is an illustration of how a deposit can alter the geometric parameters, particularly the path angle, of an acoustic path between transducers—dotted line indicates the effective path in the absence of deposits, and the continuous line the path when deposits form in the cavity.
Figure 6:
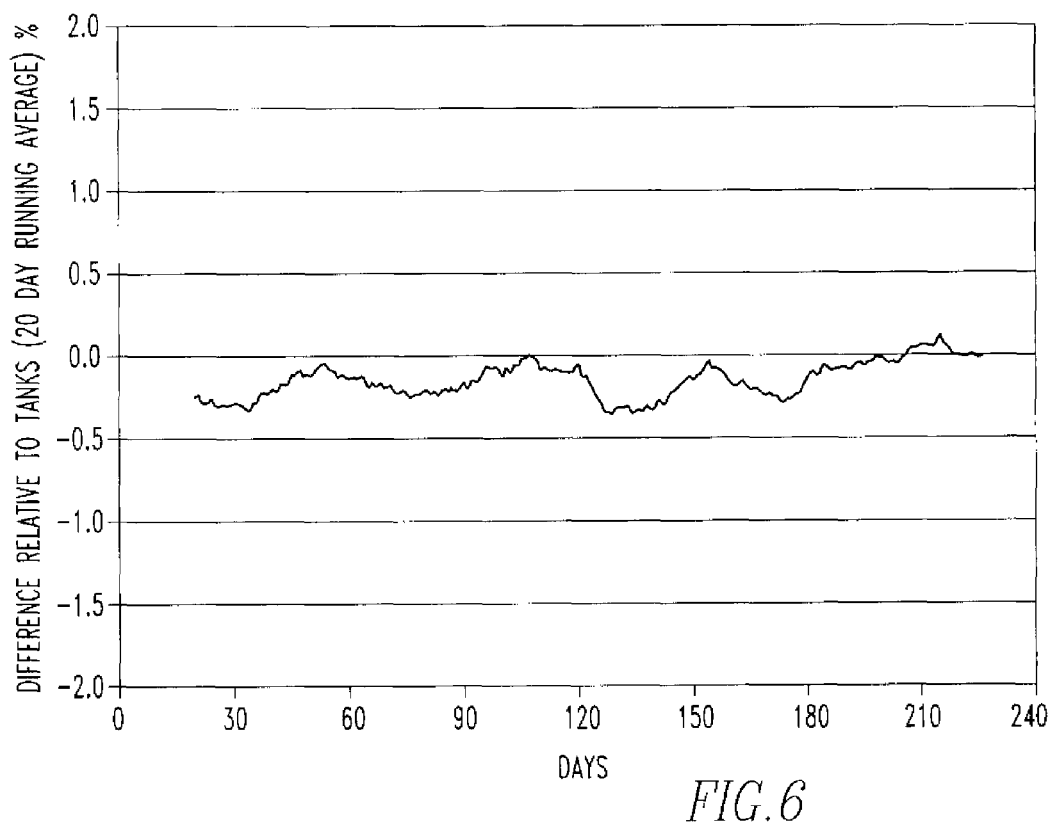
FIG. 6 shows a comparison of the coated ultrasonic flowmeter registration with the pipeline receiving tanks.
Figure 7:
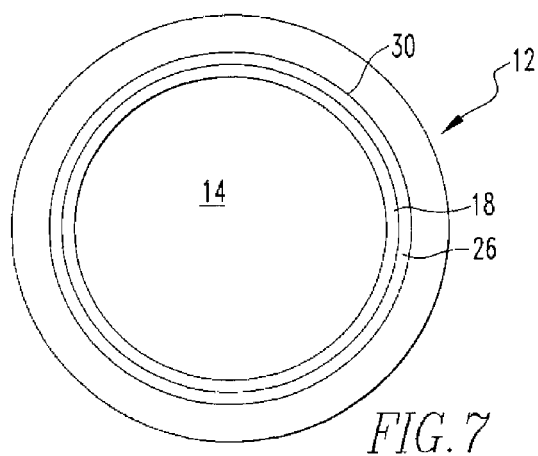
FIG. 7 is a cross-sectional view of the meter body of the present invention.

Referring now to the drawings wherein like reference numerals refer to similar or identical parts throughout the several views, and more specifically to FIGS. 1, 5 and 7 thereof, there is shown an exemplary ultrasonic flowmeter 10. The flowmeter 10 comprises a meter body 12 including a flow passage 14 having wetted surfaces 16 through which fluid flow is to be measured. The flowmeter 10 comprises a non-stick coating 18 adhered to the wetted surfaces 16 of the meter body 12. The flowmeter 10 comprises a first transducer 20 and at least a second transducer 22 arranged around the flow passage 14 to transmit and receive ultrasonic energy. The flowmeter 10 comprises an electronic unit 24 designed to generate and receive electronic signals from the transducers and to process the signals in order to compute information related to the fluid flow rate through the passage. For instance, the electronic unit 24 may be model number 280Ci produced by Cameron International Corporation.

The flowmeter 10 may have a corrosion-resistant coating 26 adhered to the wetted surfaces 16 of the meter body 12. The coating may be continuous on the flow passage 14 surface. The meter body 12 may include transducer housings 28 that also have a non-stick coating 18 adhered to their surface. The meter body 12 may include transducer housings 28 that also have a corrosion-resistant coating 26 adhered to their surface. The transducer housings 28 may be recessed in the wall 30 of the flow passage 14. The transducer housings 28 may protrude into the flow passage 14. The ultrasonic signals sent or received by the transducers pass through the coatings and are unaffected by the coatings. This is important or the coatings could not be used.

The coating may be either a polymer, a fluoropolymer, a plastic, a ceramic, an epoxy, a metal, or a composite. The coating may comprise multiple layers. The non-stick coating or corrosion-resistant coating 26 or both may be continuous and impervious. The meter body 12 may be made of steel. The meter body 12 and the housings may be made of different materials. The housings may be made of steel. The housings may be made of titanium. The flow passage 14 may be cylindrical. The flow passage 14 may include a reduced bore section or change in cross-sectional area, such as described in U.S. Pat. No. 7,810,401, incorporated by reference herein. There may be a gap between a distal end of the transducer housing and the wall 30 of the flow passage 14.

The present invention pertains to a method for measuring fluid flow with an ultrasonic flowmeter 10. The method comprises the steps of flowing fluid through a flow passage 14 having wetted surfaces 16 of a meter body 12. The flowmeter 10 has a non-stick coating 18 adhered to the wetted surfaces 16 of the meter body 12. There is the step of transmitting and receiving ultrasonic energy through the flowing fluid between a first transducer 20 and at least a second transducer 22 arranged around the flow passage 14. There is the step of generating electronic signals for and receiving electronic signals from the first and second transducers 20 and 22 with an electronic unit 24. There is the step of processing the signals with the electronic unit 24 in order to compute information related to the fluid flow rate through the passage.

The present invention pertains to a method of making an ultrasonic flowmeter 10. The method comprises the steps of attaching a first transducer 20 and at least a second transducer 22 to transmit and receive ultrasonic energy to a meter body 12 of the flowmeter 10 arranged around a flow passage 14 of the meter body 12, and to which an electronic unit 24 designed to generate and receive electronic signals from the transducers and to process the signals in order to compute information related to the fluid flow rate through the passage are in electrical communication. There is the step of adhering a non-stick coating 18 to wetted surfaces 16 of the flow passage 14 of the meter body 12 through which fluid flow is to be measured.

There may be the step of adhering a corrosion-resistant coating 18 to the wetted surfaces 16 of the flow passage 14 of the meter body 12 through which fluid flow is to be measured.

In the operation of the invention, the problems of deposition and corrosion by providing an impermeable non-stick coating 18 to the internal surfaces of an ultrasonic flowmeter 10 is addressed. The coating either minimizes or eliminates corrosion and the deposition of paraffin wax, asphaltines, scale or black powder.

An ultrasonic flowmeter 10 according to an embodiment of this invention comprises a meter body 12 that supports at least two ultrasonic transducers and has a passage through which fluid flows. The ultrasonic transducers are connected to an electronic unit 24 that coordinates the transmission and reception of ultrasonic signals and the process the signals to determine ultrasonic transit times and hence information about fluid flow rate. The transducers may be placed on the outside of the meter body 12, or may be placed in transducer housings 28 that are integrated into the meter body 12. Such transducers may be made of a similar material to the meter body 12 or may be of a different material. For example the body may be of stainless steel and the transducer housings 28 of titanium. The wetted surfaces 16 of the meter body 12 are those interior surfaces that are normally in contact with the process fluid. An ultrasonic flowmeter 10 according to the invention has an impermeable, non-stick coating 18 covering the wetted surfaces 16 of the meter body 12, inclusive of the wetted surfaces 16 of any integrated transducer housings 28.

A variety of coating materials and methods are known in other uses have suitable properties for use in this invention. So-called fluoropolymer coatings are one example of a coating material that is suitable for this purpose. A wide variety of fluoropolymer coatings exist in the market today including PVF (polyvinylfluoride) PVDF (polyvinylidene fluoride) PTFE (polytetrafluoroethylene) PFA (perfluoroalkoxy polymer) FEP (fluorinated ethylene-propylene) ETFE (polyethylenetetrafluoroethylene) and ECTFE (polyethylenechlorotrifluoroethylene). Other types of coating that may have suitable properties include other polymers such as polyurethane, diamond-like coatings, ceramics and epoxies.

The coating may be applied as a single layer or in multiple layers. A variety of application methods may also be employed including liquid based application, thermal and plasma spraying or powder spray coating. A primer layer may be used to enhance adhesion of the non-stick layer to the interior of the meter body 12. This primer layer could be a different form of polymer layer or could be a sprayed metal layer. Multiple layers may be advantageous in obtaining the required impermeable and non-stick properties at the wetted surface in combination with good adhesion to the meter body 12.

FIG. 1 shows an example of an ultrasonic flowmeter 10 body according to the present invention. In this embodiment, the flow passage 14 is cylindrical and the transducers enclosed in housings that are integrated into the meter body 12 at an angle of 45 degrees to the central axis and are slightly recessed. Alternative arrangements, including placing the ultrasonic transducers on the outside of the flowmeter 10 body can be envisaged without departing from the spirit of the invention. Protruding transducers and transducer arranged at different angles to the pipe axis are variations easily understood by one skilled in the art. Alternative shapes of flow passage 14 can also be readily conceived. The flow passage 14 may have flanged end connections or some other means for integration into a pipeline or flow system. A variety of means can be used for construction of the meter body 12, including casting, welding and machining.

In one simplified form, the flow velocity, v, can be related to the measured transit times according to the following equation $$v = \frac{L(t_{ab} - t_{ba})}{2\cos\theta t_{ab} t_{ba}}$$

where L is the length of the path connecting transducers a and b, θ is the angle of the path and $t_{ab}$ and $t_{ba}$ are the transit times from a to b and vice versa. The flowrate, Q, can be found by multiplying the velocity by the cross-sectional area of the flow passage 14, A, giving $$Q = Av = A\frac{L(t_{ab} - t_{ba})}{2\cos\theta t_{ab}t_{ba}}$$

therefore, any deposition that alters the cross-sectional area A, will affect the relationship between the flowrate and the measured transit times and thus may cause an error. Furthermore, any deposition at the interface where the sound waves pass into the fluid can alter the path angle θ and the effective path length L.

Using the example of the meter body 12 shown in FIG. 1 the coating is applied to three areas of the internal surface: the wetted surface of the cylindrical flow passage 14, the surface of the cavities in which the transducer housings 28 reside, and the wetted surfaces 16 of the transducer housings 28 themselves. Depending on the materials and design of the meter body 12, and the coating process employed, the coating process may be applied to an assembled meter body 12 or it may applied separately to the housings and main part of the body prior to assembly.

The process of coating the internal surfaces of the meter body 12 or its constituent part will normally involve several steps. The following description is typical of the process.

First, the surfaces that are to be coated will be cleaned to remove any unwanted materials such as grease and corrosion inhibitors. Various chemicals such as solvents or degreasers may be used in this stage and further cleaning by means of high temperature baking may be included.

The surface will typically be roughened to provide a surface finish suitable for good adhesion of coatings. The cleaning and/or roughening steps may include processes such as chemical etching or grit blasting with sand, metal shot or aluminium oxide. The preparation steps are of high importance and may be varied to suit the material and the size of the components.

Once the surface has been prepared, the first layer of coating is applied, followed by subsequent layers as required. Each layer may be applied by an appropriate process such as liquid-based coating or powder coating.

The final layer will generally comprise a coating with non-stick properties. For example, a mix of fluoro-polymer components can be selected. The overall coating structure is selected such that it will also have good adhesion and low permeability.

The process of forming the coating will typically involve one of more stage of 'baking' or 'curing' where the part is heated to a sufficient temperature to convert the applied coating into a continuous film and bond it to the surface beneath. The temperature required for the curing process may typically be in the region of 300 to 350° C. but will vary with each coating material.

As the flowmeter 10 assembly may contain component parts unsuitable for the temperatures involved in the curing process, the ultrasonic meter may be assembled after the coating has been applied to the meter body 12 parts. This stage will involve installation of transducer housings 28 and ultrasonic transducer elements, routing, connection and sealing of electrical cables, connection of electronics, factory acceptance testing of the assembly, and painting.

The total coating thickness applied is generally in the range of 10 to 600 micrometers, and typically at the lower end of the scale, and as such has no consequential effect on the acoustic properties of the assembly or its function as an ultrasonic flowmeter 10, other than the beneficial effect of minimizing contamination build up on the interior surfaces of the meter body 12.

Example of Performance Treated Meters

Ultrasonic flowmeters 10 according to the current inventions has been manufactured and tested both in laboratory and field conditions. The flowmeters 10 in this case had eight or sixteen ultrasonic transducers arranged to form four or eight chordal paths through a flow passage 14 of circular cross-section with flanged end connections, similar in general to the layout shown in FIG. 1. Variants in design of the flowmeters 10 that have been made and tested include transducer housings 28 recessed back from the wall 30 of the flow passage 14 with a small gap between the housing the meter body 12, transducer housings 28 recessed but with a larger gap between the housing and the meter body 12, and transducer housings 28 that intrude into the flow passage 14. Materials used in construction of the test meters include stainless steel and titanium.

Figure 2:
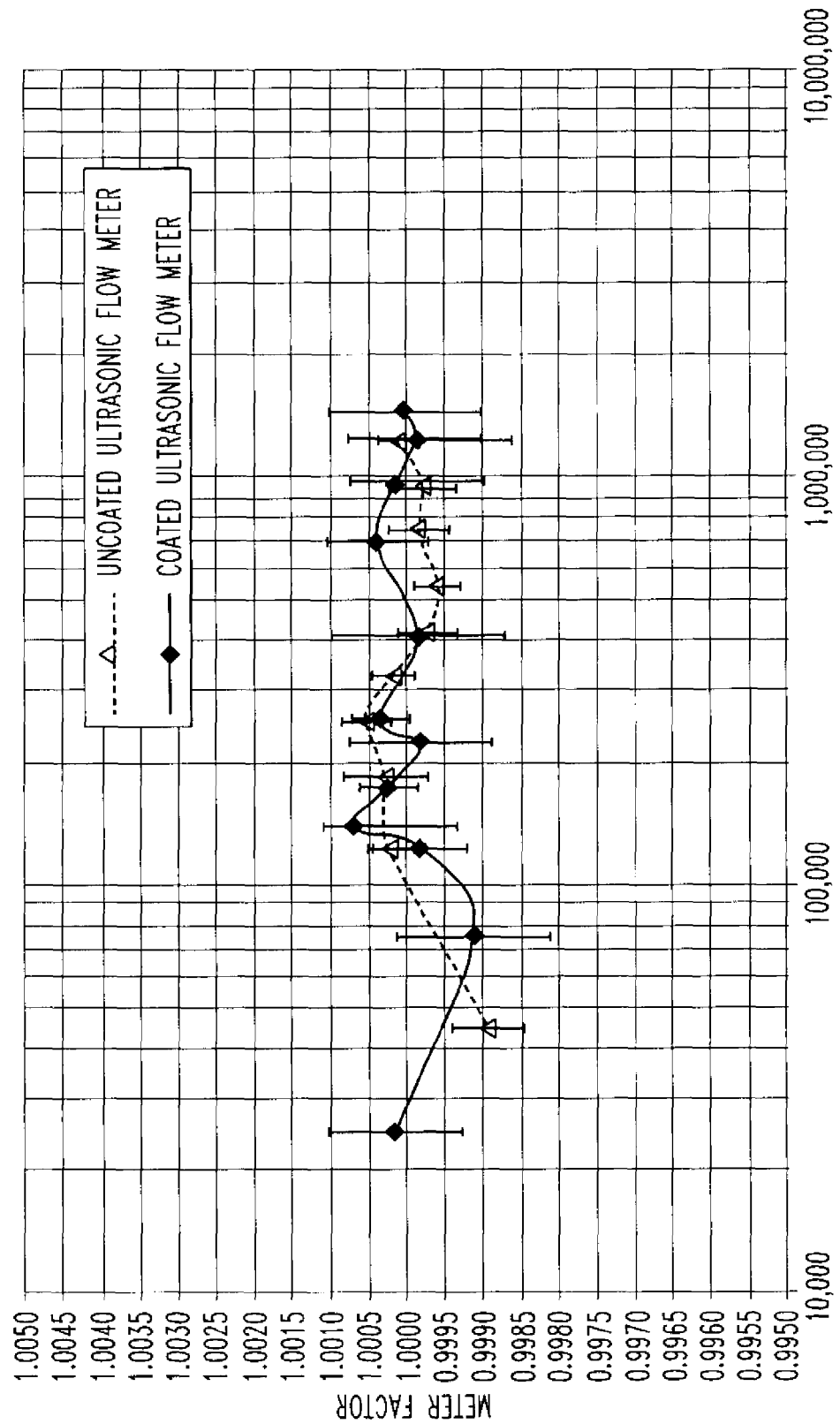
FIG. 2 shows calibration results comparing the performance of uncoated and coated ultrasonic flowmeters.

In the case of the meter with the recessed housings and the small gap, the design geometry is essentially the same as a standard meter, with the exception of the addition of the thin coating layer. Therefore the performance of a coated and an uncoated meter can be compared. FIG. 2 shows calibration results from coated and uncoated four-path ultrasonic meters with a flow passage 14 diameter of 16 inches. These results were obtained by comparison with traceable volumetric reference standards. The primary measure of the performance of the meter is its linearity. These results show a linearity of +1-0.08% in both cases, demonstrating that the performance of the ultrasonic meter is not degraded by application of the non-stick coating 18.

Flowmeters 10 according to the invention have been installed in a crude oil pipeline where it was known that there were problems relating to deposition of wax and other by-products of the hydrocarbon production and transportation, and on an offshore hydrocarbon gas production line where there had been a history of problems of wet-gas (i.e. hydrocarbon gas with free liquid components). In both cases, the meters have been visually inspected following an extended period of operational use and have been found to be in a much more pristine condition than the adjoining sections of uncoated pipe.

Uncoated Meter Performance

In the crude oil pipe line application an uncoated meter was installed prior to the coated meter installation and the effects of contamination build up were observed. The contamination effects were evaluated by three means: (1) by visual inspection; (2) by a long-term comparison of the volume transfer reported by the meter compared with that recorded in the receiving tanks; and (3) by analysis of ultrasonic fluid profile and signal diagnostics.

Visual inspection of the uncoated meter after several months of operation showed material that was adhering to the internal surfaces of the meter body 12, particularly in the cavities where the recessed transducer housings 28 were positioned. Analysis of a sample of the material showed that it was primarily paraffin wax.

Figure 3:
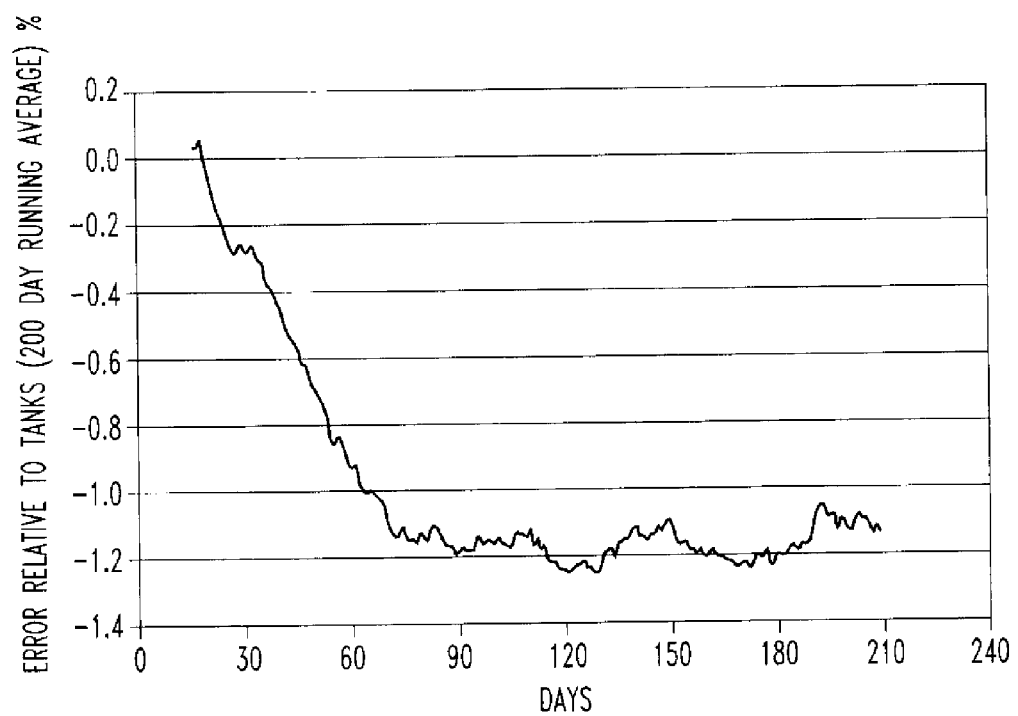
FIG. 3 shows a comparison of the uncoated ultrasonic flowmeter registration with the pipeline receiving tanks.

A long-term comparison of the volume transfer recorded by the meter versus the volumes recorded in the receiving tanks of the pipeline showed that when first installed the uncoated ultrasonic flowmeter 10 was in good agreement with the receiving tanks, but as time progressed an error or 'measurement bias' developed in the flowmeter 10. FIG. 3 shows the 20-day running average error of the flowmeter 10 relative to the receiving tanks. It can be observed that the error is initially less than 0.1%, which is consistent with performance expectations for this type of meter, but that as time progresses the error becomes increasingly negative, until it reaches a level of approximately −1.2%. This magnitude of measurement error is not acceptable in many hydrocarbon measurement applications.

Figure 4:
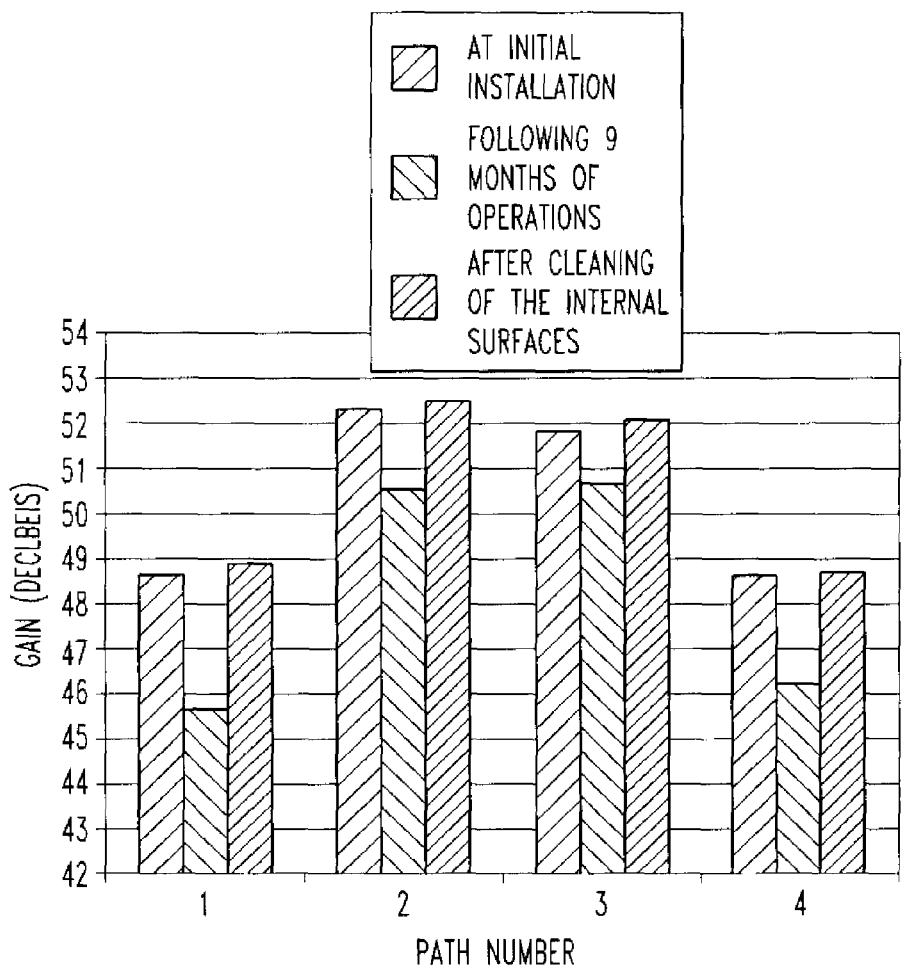
FIG. 4 shows a record of gain automatically applied to ultrasonic signals showing the changes that occurred as the result of deposition on the internal surfaces of the meter body.

FIG. 4 shows the gain reported for the measurement paths of the meter at three different stages of evaluation: on initial installation, after approximately 9 months of operation, and following cleaning of the internal surfaces that took place following the operational period. The gain describes the magnitude of amplification applied to the ultrasonic signals to maintain the amplified result within a certain range of amplitude. Therefore any change in gain is indicative of a change in the transmission of the ultrasonic signal as it passes from the transducer housing of the transmitter, through the interior of the flow passage 14, and into the receiving transducer at the other side. It can be observed that the gain values are approximately 52 dB for paths 2 and 3 and approximately 48.5 dB for paths 1 and 4. Following the period of normal operation these values have reduced to approximately 50.5 dB and 46 dB respectively. After the internal surfaces of the meter body 12 have been cleaned the gain values return to a level that is very close to that originally recorded confirming that the deposition on the internal surfaces of the meter body 12 had altered the ultrasonic signal transmission.

From the information in FIGS. 3 and 4, and supported by the distribution of the deposition observed during visual inspection it was deduced that the mechanism by which the deposition results in a flow rate measurement error in this case was mainly by alteration of the angle of the acoustic paths. As illustrated in FIG. 5, if a deposit forms in the cavity in front of an ultrasonic transducer housing, this can act to alter the effective centre and angle of the acoustic path. As the relationship between the velocity along the path and the measured transit times is very sensitive to this angle, any uncompensated change in the path angle can result in a significant measurement error.

Treated or Coated Meter Performance

A coated meter according to the invention was installed in the same crude oil pipeline and monitored to determine the effectiveness of the coating in reducing the measurement errors previously observed. Following a period of more than 7 months, the meter was visually inspected. In comparison with the uncoated meter, the coated meter was substantially free of deposition, with any deposits present being of much smaller size. Analysis of signals diagnostics over the same period showed no substantial changes in parameters such as gain, reinforcing the findings from the visual inspection. In the same manner as previously the volume registered by the coated flowmeter 10 was compared with the volume recorded in the receiving tanks. In the case of the coated meter, the difference between the flowmeter 10 and the tanks did not show a gradual development of a large bias or error. Instead it can be observed that the difference between the meter and the tanks remains with a range of +0.1 to −0.35%. Given the uncertainty inherent in performing such a comparison under field conditions, this span of results is considered consistent with expectations for high accuracy metering.

From these studies, it is believed that the invention has no negative impact on the measurement performance of the ultrasonic flowmeter 10 and a beneficial effect such that this level of performance can then be maintained in applications where deposition or corrosion is likely.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. An ultrasonic flowmeter comprising:
   a meter body including a flow passage having wetted surfaces through which fluid flow is to be measured, said flowmeter having a non-stick coating adhered to the wetted surfaces of the meter body and including a first transducer cavity also having a non-stick coating and a second transducer cavity having a non-stick coating, the wetted surfaces roughened to which the non-stick coating is adhered;
   a first transducer and at least a second transducer arranged around the flow passage to transmit and receive ultrasonic energy, the first transducer disposed in the first transducer cavity and the second transducer disposed in the second transducer cavity; and
   an electronic unit which generates and receives electronic signals from the transducers and to process the signals in order to compute information related to the fluid flow rate through the passage.

2. The flowmeter of claim 1 wherein said flowmeter has a corrosion-resistant coating adhered to the wetted surfaces of the meter body.

3. The flowmeter of claim 1 where the non-stick coating is continuous on the flow passage surface.

4. The flowmeter of claim 1 where the meter body includes transducer housings that also have a non-stick coating adhered to their surface.

5. The flowmeter of claim 2 where the meter body includes transducer housings that also have a corrosion-resistant coating adhered to their surface.

6. The flowmeter of claim 4 where the transducer housings are recessed in the flow passage wall.

7. The flowmeter of claim 5 where the transducer housings are recessed in the flow passage wall.

8. The flowmeter of claim 4 where the transducer housings protrude into the flow passage.

9. The flowmeter of claim 5 where the transducer housings protrude into the flow passage.

10. The flowmeter of claim 1 where the non-stick coating is either a polymer, a fluoropolymer, a plastic, a ceramic, an epoxy, a metal, or a composite.

11. The flowmeter of claim 1 where the non-stick coating comprises multiple layers.

12. The flowmeter of claim 1 where the non-stick coating is continuous and impervious to the fluid.

13. The flowmeter of claim 1 where the meter body is made of steel.

14. The flowmeter of claim 4 where the meter body and the housings are made of different materials.

15. The flowmeter of claim 4 where the housings are made of steel.

16. The flowmeter of claim 4 where the housings are made of titanium.

17. The flowmeter of claim 1 where the flow passage is cylindrical.

18. The flowmeter of claim 1 where the flow passage includes a reduced bore section or change in cross-sectional area.

19. The flowmeter of claim 4 where there is a gap between a distal end of the transducer housing and the wall of the flow passage.

20. A method for measuring fluid flow with an ultrasonic flowmeter comprising the steps of:

flowing fluid through a flow passage having wetted surfaces of a meter body, said flowmeter having a non-stick coating adhered to the wetted surfaces of the meter body and including a first transducer cavity also having a non-stick coating and a second transducer cavity having a non-stick coating, the wetted surfaces roughened to which the non-stick coating is adhered;

transmitting and receiving ultrasonic energy through the flowing fluid between a first transducer and at least a second transducer arranged around the flow passage, the first transducer disposed in the first transducer cavity and the second transducer disposed in the second transducer cavity;

generating electronic signals for and receiving electronic signals from the first and second transducers with an electronic unit; and processing the signals with the electronic unit in order to compute information related to the fluid flow rate through the passage.

21. A method of making an ultrasonic flowmeter comprising the steps of:

attaching a first transducer disposed in the first transducer cavity and at least a second transducer disposed in the second transducer cavity to transmit and receive ultrasonic energy to a meter body of the flowmeter arranged around a flow passage of the meter body, and to which an electronic unit designed to generate and receive electronic signals from the transducers and to process the signals in order to compute information related to the fluid flow rate through the passage are in electrical communication; and adhering a non-stick coating to the first and second transducer cavities and to wetted surfaces of the flow passage of the meter body through which fluid flow is to be measured, the wetted surfaces roughened to which the non-stick coating is adhered.

22. The method of claim 21 including the step of adhering a corrosion-resistant coating to the wetted surfaces of the flow passage of the meter body through which fluid flow is to be measured.

\* \* \* \* \*